United States Patent [19]

Longmore et al.

[11] 4,079,699

[45] Mar. 21, 1978

[54] AUTOMATIC, TIMED, ADJUSTABLE QUANTITY FEEDING DEVICE

[76] Inventors: Edward Glen Longmore; Betty Marie Longmore, both of 13632 Yosemite Dr., Westminster, Calif. 92683; Leonard Bohacik; Dona Elena Bohacik, both of 9452 Skylark Ave., Garden Grove, Calif. 92641

[21] Appl. No.: 658,055

[22] Filed: May 21, 1976

[51] Int. Cl.² .............................................. A01K 5/02
[52] U.S. Cl. .................................. 119/51.11; 119/51.5
[58] Field of Search ............... 119/51.11, 54, 56 R, 119/51.5; 222/56, 77, 281; 177/115, 114

[56] References Cited

U.S. PATENT DOCUMENTS

| 1,967,022 | 7/1934 | Chandler | 119/54 |
| 3,256,861 | 6/1966 | Gilner | 119/51.11 |
| 3,648,660 | 3/1972 | Esquival | 119/51.11 |

*Primary Examiner*—Hugh R. Chamblee
*Attorney, Agent, or Firm*—Fulwider, Patton, Rieber, Lee & Utecht

[57] ABSTRACT

This invention relates to the remote and unattended control of animal feeding and is more particularly concerned with a novel means of feeding unattended animals for extended periods of time.

7 Claims, 4 Drawing Figures

AN AUTOMATIC, TIMED, ADJUSTABLE QUANTITY ANIMAL FEEDING DEVICE

BACKGROUND OF THE INVENTION

1. Field of the Invention

This invention relates to the field of animal feeding and care more particularly to the feeding of domesticated animals. It improves over the method of having to hand feed an animal or having a friend or neighbor tend a pet while the owner is unable to do so because of absence.

2. Description of the Prior Arts

So far as is known, the simple and improved automatic animal feeder described and claimed herein has not been known heretofore.

Prior inventions of this type have not been known heretofore. They have also not been known to solve the problem of feeding and watering an animal at the same time while the animal is unattended.

The improvement resides also in the fact that the food is sealed off from air and weather elements that could deteriorate from the state in which it was purchased and loaded into the holding container before release for feeding the animal.

The invention is also an improvement over the prior art that food can be measured out in quantities to suit the size of the animal that is being fed and it can be dispensed at different or desired times of day according to the needs of the animal.

Another improvement is that fresh water can be dispensed each time fresh food is released, where before a human hand has been needed to supply the water once or twice a day or leave a large container of water out for the animal. Food and water so dispensed frequently gets stale after a day.

Similar devices of this type need much more maintenance required by human hands and water must be supplied from an outside source where the present unit has both food and water self-delivered.

Prior inventions for feeding domesticated animals are of gravity feed types which can allow an animal to feed until all of the food is gone. This oftentimes will cause bloating of the animal and on occasion the animal will vomit. Prior systems have resulted in leaving the animal without additional food for later times or days to come.

This invention relates generally to an improved automatic, timed, adjustable quantity animal feeding device having the ability to dispense feed to unattended animals. It can dispense a predetermined quantity of feed commensurate with dietary requirements of the animal or animals of interest. Still another objective is to provide a means of ready and simple adjustment of the mechanism to the predetermined quantity of feed prior to leaving the animal(s) unattended. It improves the problems of leaving food unsealed to get spoiled from weather and having the problem of bugs such as flies, birds, ants and roaches from getting to the fresh food.

It has the means of supplying fresh water regularly with fresh feed all timed and measured by the size of the animal(s). It can regulate the feeding not to allow an animal to over eat causing sickness or doing without feed in days to come. It has generally solved the problem by a mechanism wherein dry feed is stored and dispensed at predetermined times daily and in selectable quantities and the invention is singularly applicable to home owners and commercial enterprises which keep pets and watch dogs on the premises during the occupant's absence for weekends, vacations, business trips, etc.

Therefore, from the foregoing, it should be understood that objects of this invention include; an improved method of feeding an animal(s) unattended automatically at predetermined times and in predetermined quantities by means of a container having the ability to store and dispense dry feed with fresh water supplied once or twice a day.

A further object of this invention is that it can hold feed of the dry type and of any size in current use. The feed is placed in the hopper in any quantity up to full. At the present time the drive motor is energized by AC or DC current and food is passed between two counter rotating, deeply soft, non-food crushing rollers collecting by gravity into the weighing tray, which when the preset weight is met, which is determined by adjusting a counter weight on a support shaft locked with a lock nut accessible through an access door located in the back of the unit, de-energizes the motor and drops the contents into the delivery chute where the food flows by gravity into the feeding dish. The mechanism then resets itself for the next cycle. During the drive motor energization period, the water control solenoid valve is also energized, allowing water to flow to the drinking water dish and to the feeding dish in quantities predetermined by the adjustment valves.

Another object relates also to methods for providing moistening water for the timed and predetermined quantity of food and as an alternate, a constant drinking water level rather than timed predetermined drinking water quantities.

Another object of this invention is to provide a constant water level in the drinking water dish by yet another means, when desired, and when a pressure water supply system is not available. This accomplished by the means of a removable sealed storage tank appended to the main structure with the tanks relatively small filler neck opening extending down deeply into the water drinking tank. This alternate technique is simpler, therefore, less costly and is suitable for who can handle the weight of the filled tank.

A further objective of this invention is to provide a constant water level in the drinking water dish, when desired, and when a pressure water supply system is not available. This is accomplished by a means of a suitably dimensioned water storage tank appended to the main structure with the passive float-type control valve mechanism contained in the storage tank member and which extends downward suitably far into the drinking water dish to provide float action.

These and other objects of the invention will become apparent from a study of the following disclosure in which reference is directed to the attached drawing.

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

Figure 4:
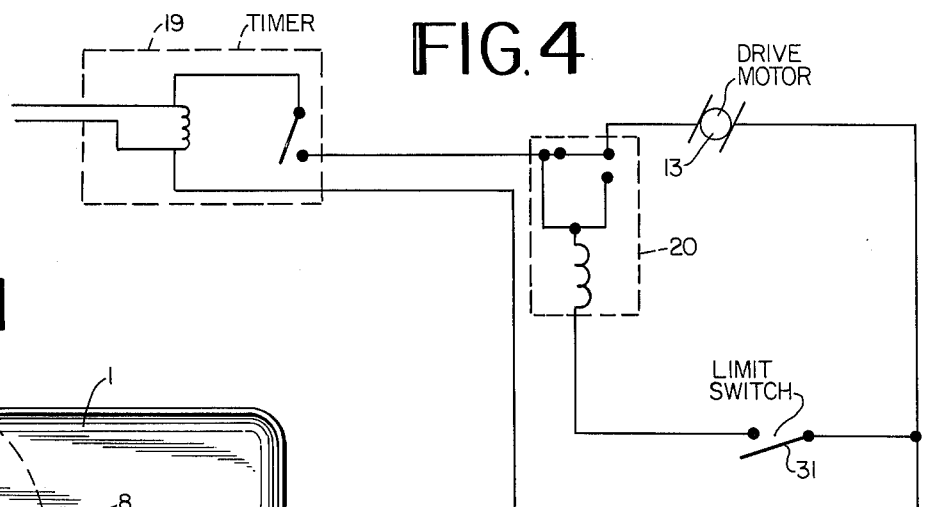
FIG. 4 is a schematic diagram of the electrical control system.
Figure 1:
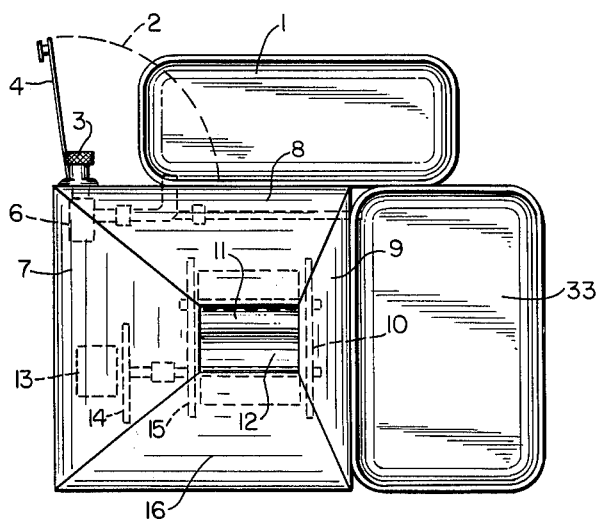
FIG. 1 shows the plan view as seen from above with the adjustment access door open and without the storage hopper cover when the unit is in its normal upright position.
Figure 2:
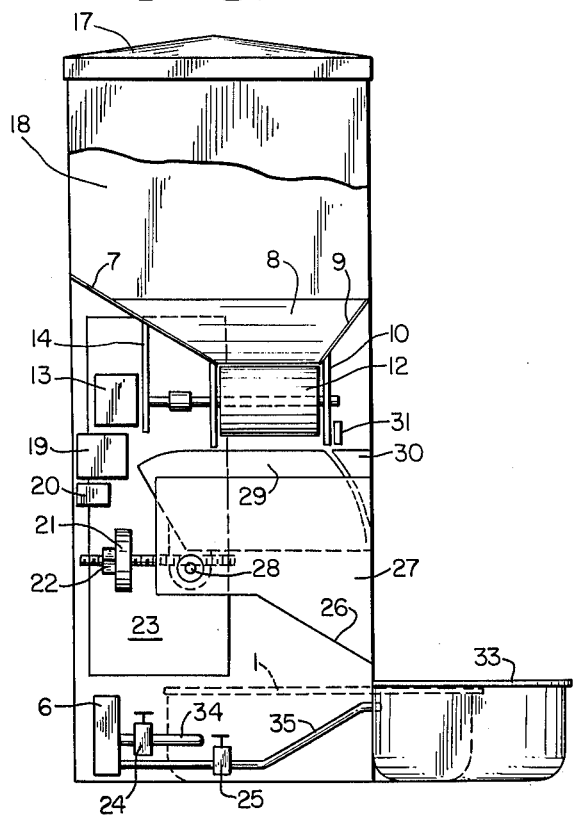
FIG. 2 is a side view of the assembly with the near side panel removed to show the internal mechanisms.

Referring now to the drawings FIG. 1, FIG. 2 and FIG. 3 and FIG. 4:

One embodiment of this invention as shown in the drawings includes a structure with a storage hopper 18 with access from the top by removal of the weather cover 17, and with the feed containment maintained by the back slant plate 7, the side slant plates 8 and 16, the front slant plate 9, and the two rollers 11 and 12. Although the weight of the food tends to rotate the rollers in the direction of the arrows in FIG. 3 and the idler roller 11 is free to rotate, drive roller 12 is not, due to the gearing ratio in the drive motor 13.

Adjustment of the timer for time(s) of day of feeding, adjustments of the counterweight of quantity of food at each feeding, and adjustments of water quantity for food moistening and for drinking are made through the access opening 23 available when access door 4 opens its hinge 5 through arc 2.

The dispensing cycle is initiated when the adjustable timer 19 energizes the drive motor 13 circuit through the normally closed contacts of relay 20.

Figure 3:
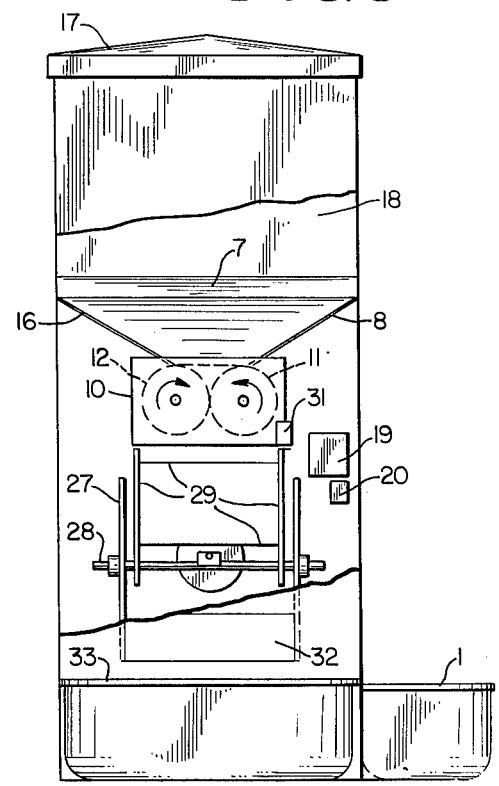
FIG. 3 is the front view of the assembly facing the feeding dish, and with the front panel partially removed to show the internal mechanisms.

Drive roller 12 now rotates in the direction of the arrow shown in FIG. 3 engaging food particles which depress equally into the surfaces of the drive roller 12 and the idler roller 11 causing the idler roller 11 to rotate in the direction of the arrow in FIG. 3. By this action, the food passes between the rollers, dropping onto the weighing tray 29 until the total weight of tray and feed exceeds the counterweight 21 as adjusted on its support shaft and locked in place by lock nut 22, accessible through access door 4 and opening 23.

At this point, weighing tray assembly 29, rotating on its shaft 28 and supported by the chute guides 27, immediately releases limit switch 31, whose normally closed contacts have been held open by virtue of the position of the weighing tray 29, during the quiescent mode of the cycle. Closing of the normally closed contacts of limit switch 31 now energizes the relay 20 coil which opens its normally closed relay contacts, de-energizing the motor 13 circuit and simultaneously locking relay 20 in the energized position through its normally open contacts, thereby, holding the motor 13 circuit de-energized.

The weighing tray assembly 29 upon rotation under load of its food content, by virtue of the position of its center of gravity with respect to its center of rotation, rotates until it contacts the chute surface 26, drops its entire content and returns to its quiescent position. This action again opens the normally closed contacts of limit switch 31 which will then allow the relay 20 to drop out and to close the normally closed contacts in the motor 13 circuit at the time that timer 19 de-energizes the system prior to the initiation of the next cycle. The dropped food quantities, directed by chute guides 27 flows by gravity down chute surface 26 through chute exit 32 into feeding dish 33.

Simultaneously during the period of drive motor 13 energization, solenoid valve 6 is energized permitting water from water inlet 3, (garden hose or hand piping) through water solenoid valve 6 through adjustment valve 24 and line 34 to drinking water dish 1 and through adjustment valve 25 and line 35 to feeding dish 33. The adjustment valves are accessible through access door 4 and opening 23.

The rollers 11 and 12 rotate on their own individual shafts supported and positioned by the aft shaft support member 15 attached to aft slant plate 7 and front shaft support member 10 attached to the front slant plate 9.

Drive motor 13 is coupled only to the drive roller 12 and is supported and positioned by motor support member 14 attached also to the aft slant plate 7.

The embodiment of the structure and mechanism is not to be construed as limiting to the configuration displayed wherein shown are four sides of equal rectangualr size and shape. Economies of materials and fabrication could dictate a more efficient use of structural members and component positioning, reshaping the geometry of the structure without altering the objects of this invention.

We claim:

1. Apparatus for automatically supplying food for unattended consumption by animals comprising:

a feeding container accessible to animals to be fed;

a housing enclosing in a manner inaccessible to animals to be fed: means for storing animal food, a pair of parallel, horizontal, soft, non-crushing, counter rotatable, food dispensing rollers located below said food storage means for passing food downward when enabled, a serving tray located beneath said rollers for receiving food passed thereto by said roller, a sloping chute located beneath said serving tray, the lower extremity of which emptys into said feeding container, means for automatically enabling said rollers to rotate to pass animal food from said food storing means to said serving tray at preselected starting times; and means responsive to a predetermined weight of animal food on said tray after each preselected starting time, for automatically disabling said enabling means and for dumping the predetermined amount of animal food into said chute, whereby said predetermined amount of food passes from said housing into said feeding container.

2. Apparatus according to claim 1 further comprising:

water solenoid valve means coupled to said enabling means and said disabling means;

a water reservoir located within said housing;

a water line connected from said reservoir through said water solenoid valve means to communicate with said serving tray to allow water to flow directly into said feeding container during each period of time that animal food is passed to said serving tray.

3. Apparatus according to claim 2 further including a water container accessible to animals to be fed, and wherein said water line has a plurality of branches, one of which is arranged in direct communication with said water container for allowing water to flow into said water container during the period of time that water is flowing into said feeding container.

4. Apparatus according to claim 1 further characterized in that said serving tray includes opposing lateral retaining walls closed at one end by a transverse end panel and terminating in an open discharge space at the other end, and further including a counterbalance mounted in cantilever fashion from said transverse end wall and adjustably movable relative thereto, and including a horizontal axis rotatably mounting said serving tray relative to said housing and extending perpendicular to said lateral retaining walls and proximate to said transverse end panel, whereby passage of said predetermined amount of food tilts and serving tray against the moment of said counterbalance to discharge food passed thereto by said rollers.

5. An apparatus for automatically supplying food comprising:
- a food container;
- means for storing food;
- a pair of horizontal, parallel, soft, non-crushing counter rotatable food dispensing rollers located below said storage means for passing food downward when enabled;
- a serving tray located beneath said rollers for receiving food passed thereto by said rollers,
- a sloping chute located beneath said serving tray, the lower extremity of which slopes to said food container;
- means for automatically enabling said rollers to rotate to pass food from said food storage means to said tray; and
- means responsive to a predetermined amount of food on said tray after each preselected starting time for automatically disabling said enabling means and for dumping the predetermined amount of food into said chute whereby said predetermined amount of food passes to said food container.

6. Apparatus according to claim 5 further characterized in that said rollers, when enabled, engage food particles which depress equally into the surfaces thereof until said food particles are released to pass to said serving tray.

7. Apparatus according to claim 6 further characterized in that one of said rollers is a drive roller and the other of said rollers is an idler roller, and further comprising a motor actuable to engage said drive roller which in turn frictionally engages said idler roller to pass food from said food storing means to said serving tray.

* * * * *

UNITED STATES PATENT OFFICE
CERTIFICATE OF CORRECTION

Patent No. 4,079,699           Dated March 21, 1978

Inventor(s) Edward Glen Longmore; Betty Marie Longmore; Leonard Bohacik; Dona Elena Bohacik It is certified that error appears in the above-identified patent and that said Letters Patent are hereby corrected as shown below:

Column 2, line 42, after "for" insert --those--.
Column 3, line 6, delete "and FIG. 3" and insert -- FIG.3--.
Column 5, line 2, delete "and" and insert --said--.

Signed and Sealed this

Twenty-fourth Day of October 1978

[SEAL]

Attest:

RUTH C. MASON
Attesting Officer

DONALD W. BANNER
Commissioner of Patents and Trademarks